(No Model.) 2 Sheets—Sheet 1.

V. HODELL & A. OLSON.
LUMBER TRUCK.

No. 573,269. Patented Dec. 15, 1896.

Witnesses.
Harry Kilgore
R. D. Merchant

Inventors.
Victor Hodell and Alfred Olson.
By their Attorney
Jas. P. Williamson (No Model.) 2 Sheets—Sheet 2.

V. HODELL & A. OLSON.
LUMBER TRUCK.

No. 573,269. Patented Dec. 15, 1896.

Witnesses.
Harry Kilgore,
R. D. Merchant.

Inventors.
Victor Hodell and Alfred Olson.
By their Attorney.
Jas. F. Williamson.

THE NORRIS PETERS CO., PHOTO-LITHO., WASHINGTON, D. C.

UNITED STATES PATENT OFFICE.

VICTOR HODELL AND ALFRED OLSON, OF MINNEAPOLIS, MINNESOTA.

LUMBER-TRUCK.

SPECIFICATION forming part of Letters Patent No. 573,269, dated December 15, 1896.

Application filed February 18, 1896. Serial No. 579,734. (No model.)

*To all whom it may concern:*

Be it known that we, VICTOR HODELL and ALFRED OLSON, citizens of the United States, residing at Minneapolis, in the county of Hennepin and State of Minnesota, have invented certain new and useful Improvements in Roller-Bolsters for Lumber-Trucks; and we do hereby declare the following to be a full, clear, and exact description of the invention, such as will enable others skilled in the art to which it appertains to make and use the same.

Our invention has for its object to provide an improvement in lumber-wagons with a view of facilitating the unloading of the same.

To this end our invention consists of the novel devices and combinations of devices hereinafter described, and defined in the claims.

Our invention is illustrated in the accompanying drawings, wherein, like letters referring to like parts throughout the several views—

Figure 1:
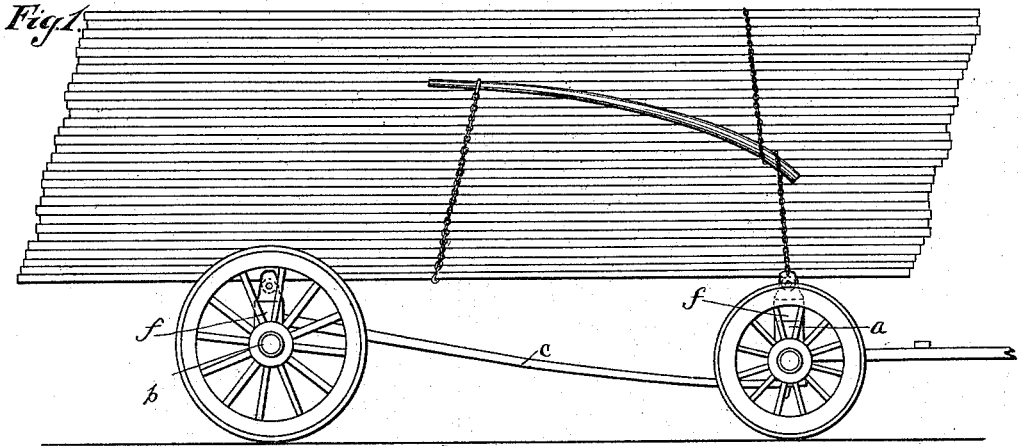
Figure 2:
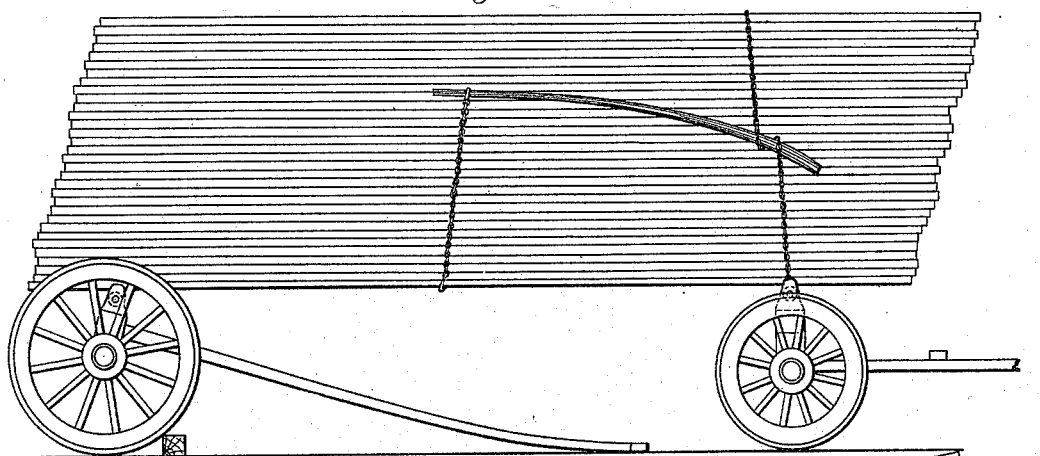
Figure 3:
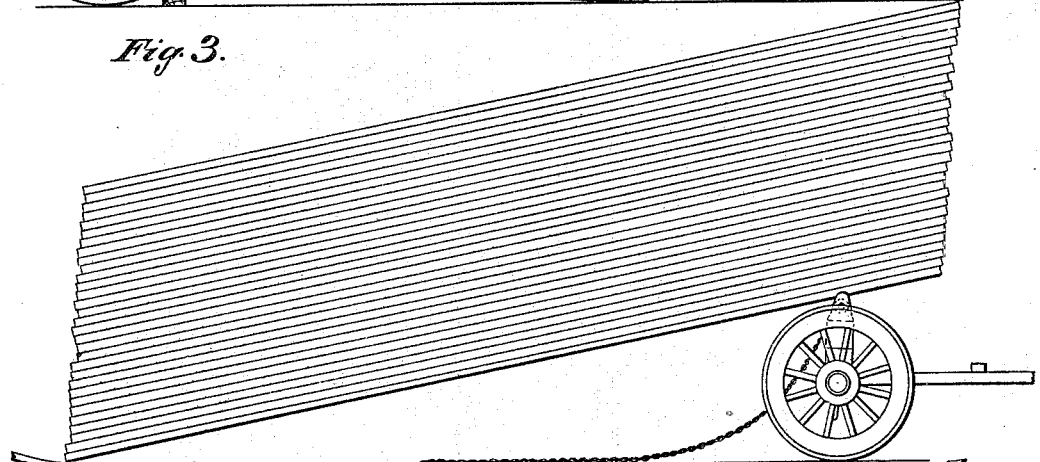
Figure 4:
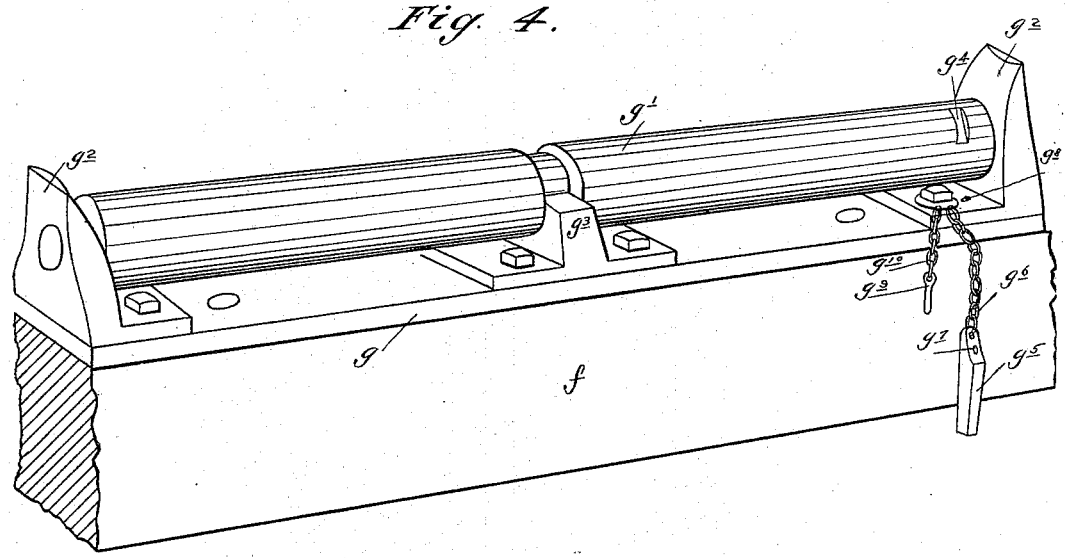
Figure 5:
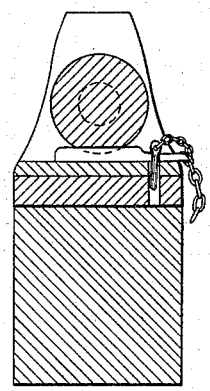

Figure 1 is a side elevation of a lumber-wagon equipped with our improvement. Fig. 2 is a diagram view of the same as the parts would appear when in the act of removing the load from the rear truck. Fig. 3 is a similar diagram view as the parts would appear when in the act of pulling out the forward truck from under the forward end of the load of lumber. Fig. 4 is a perspective view of our roller-bolster detached, and Fig. 5 is a vertical cross-section through the roller-bolster in the plane of the locking-groove.

Our invention was especially designed for application to that class of lumber-wagons which are composed of forward trucks $a$ and rearward trucks $b$, separably connected by a strong reach-bar $c$, whereby the load may be removed from one truck at a time bodily by uncoupling the two trucks and first dragging the load forward off from the rear bolster and down the reach $c$ until the rear end of the load rests on the ground and then by unbinding the load and pulling out the front truck from underneath the front end of the load. These are the kind of lumber-wagons almost universally used by the mercantile lumberman of the Northwest, on account of the convenience in unloading the same, as above noted, and on account of the fact that the load may be applied or built up on the rear truck and reach only by placing a horse underneath the front end of the reach. Otherwise stated, a much larger number of rear trucks are employed than front trucks, so as to afford a relay of the same at the sawmills or other place of loading, while the teams remain constantly hitched during the working-day to the front trucks. When it is desired to move a load, it is only necessary to back the front truck under the load and couple the same to the reach. As these loads are of great weight the trucks must be made very strong, and in unloading the same in the manner above described a heavy pull is required from the team and a great amount of wear and tear occurs to the bolsters and the reach in the dragging of the load over the same. Our invention was designed to overcome this difficulty in unloading.

To this end we provide roller-bolsters secured, preferably, to the bunkers of both axles and a locking device operated to prevent the rotation of the rollers until the time desired. The said roller-bolster is shown detached in Figs. 4 and 5, but as bolted fast to one of the axle-bunkers $f$. The bunkers $f$ are either formed integral with or bolted to the truck-axles in the usual way. The roller-bolster is made up of a body or bed casting $g$ and a roller $g'$, journaled in bearings $g^2$ and $g^3$ of the said bed-casting. The bed-casting $g$ is bolted or otherwise rigidly secured to the axle-bunker $f$, and the end bearings $g^3$ project a short distance above the roller and are outwardly inclined, so as to afford suitable stub-standards for preventing the lateral displacement of the load. The roller $g'$ is provided with a flat-faced groove $g^4$ on its periphery, with which coöperates a blocking key or pin $g^5$, as shown in Fig. 5, for preventing the rotation of the roller until the time desired. The key $g^5$ is secured to the bolster-bed $g$ by a chain $g^6$ or other flexible connection, so as to prevent the loss of the same. The key $g^5$ is also preferably provided with a hole $g^7$, adapted to register with the hole $g^8$ in the bed-casting $g$ for the application thereto of a small pin $g^9$, to prevent the key from displacement out of its locking position, as shown in Fig. 5. The said small pin $g^9$ is also made fast by a chain $g^{10}$ or other flexible connection. One of the said roller-bolsters, above described, is preferably applied to both of the truck-axles of the lumber-wagon.

Before starting to build up the load the roller or the rollers, as the case may be, are locked, of course, by the key $g^5$. On reaching the unloading-point the roller on the rear truck-axle is unlocked, and hence will be free to turn when pulling off the load from the rear truck, as shown in Fig. 2. The roller on the front truck is then unlocked and will be free to turn when pulling out the front truck, as shown in Fig. 3. In this way the pull on the team is made comparatively easy and the wear and tear on the truck-bolsters is comparatively small under the sliding motion of the load.

Of course it will be understood that minor details of the construction might be changed without departing from the spirit of our invention.

Our device above described saves also a considerable amount of time in the unloading action.

What we claim, and desire to secure by Letters Patent of the United States, is as follows:

1. The combination with a separable-truck lumber-wagon, of roller-bolsters mounted one on each truck-axle, and independent locking devices, for preventing the rotation of said respective rollers until the time desired, substantially as described.

2. The combination with the truck-axle of a lumber-wagon, of a roller-bolster thereon, the roller of which is provided with a flat-faced groove on its periphery, and a blocking-key engageable with said groove and the body of the bolster, substantially as and for the purposes set forth.

In testimony whereof we affix our signatures in presence of two witnesses.

VICTOR HODELL.
ALFRED OLSON.

Witnesses:
JAS. F. WILLIAMSON,
E. F. ELMORE.